United States Patent [19]

Reboux

[11] Patent Number: 4,471,488
[45] Date of Patent: Sep. 11, 1984

[54] DIRECT INDUCTION MELTING DEVICE FOR DIELECTRIC SUBSTANCES OF THE GLASS OR ENAMEL TYPE

[75] Inventor: Jean Reboux, Massy, France

[73] Assignee: Societe d'Applications de la Physique Moderne et de l'Electronique SAPHYMO-STEL, Massy, France

[21] Appl. No.: 424,748

[22] Filed: Sep. 27, 1982

[30] Foreign Application Priority Data

Nov. 8, 1981 [FR] France .............................. 81 20860
Jul. 30, 1982 [FR] France .............................. 82 13353

[51] Int. Cl.³ ............................................. H05B 5/16
[52] U.S. Cl. ..................................... 373/153; 373/27; 373/155
[58] Field of Search ............... 373/151, 152, 153, 154, 373/155, 158, 27, 138; 65/DIG. 4

[56] References Cited

U.S. PATENT DOCUMENTS 3,331,909 7/1967 Kasper .............................. 373/152
3,636,293 1/1972 Schneider ........................ 373/151

Primary Examiner—Roy N. Envall, Jr.
Attorney, Agent, or Firm—Roland Plottel

[57] ABSTRACT

A device is provided for melting by direct induction substances which are dielectric when cold and whose temperatures of inductibility and melting are close to each other, such as glasses or vitreous enamels. This melting is carried out inside a receptacle whose sidewall comprises a multi-turn inductor made from metal tubing whose inward-looking faces are exposed and which combines the functions of heating the charge by induction and cooling the periphery thereof. Such a receptacle which is at the same time a heating inductor and a cooling surface is applicable more especially to industrial electric furnaces for the production of molten glass or enamel by direct induction.

12 Claims, 5 Drawing Figures

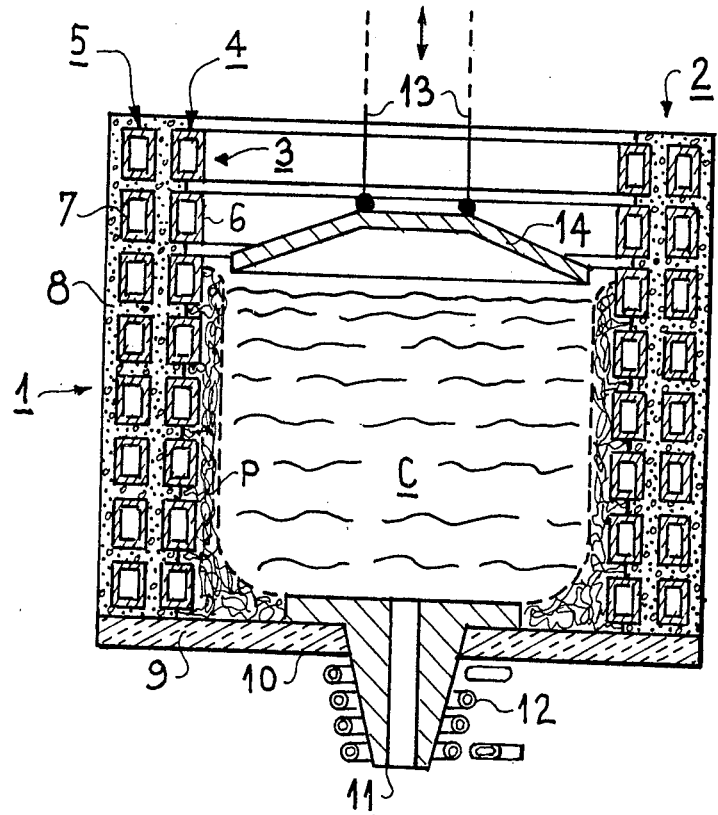
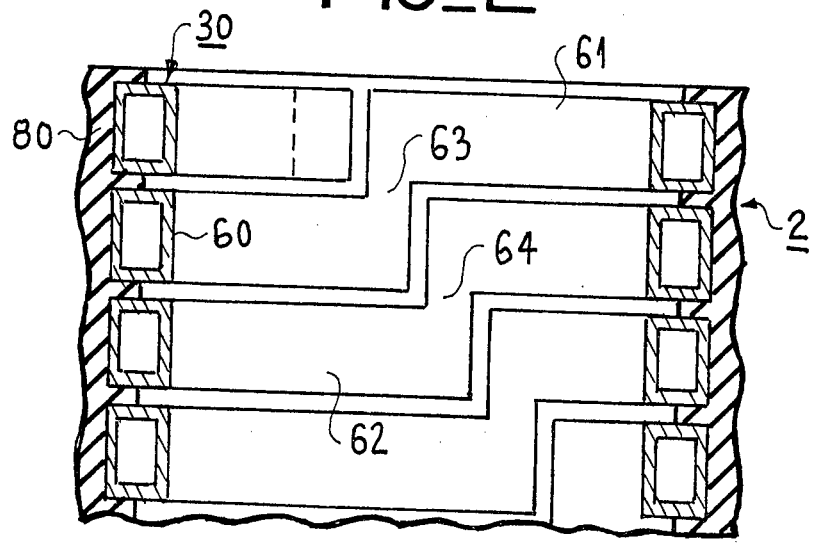

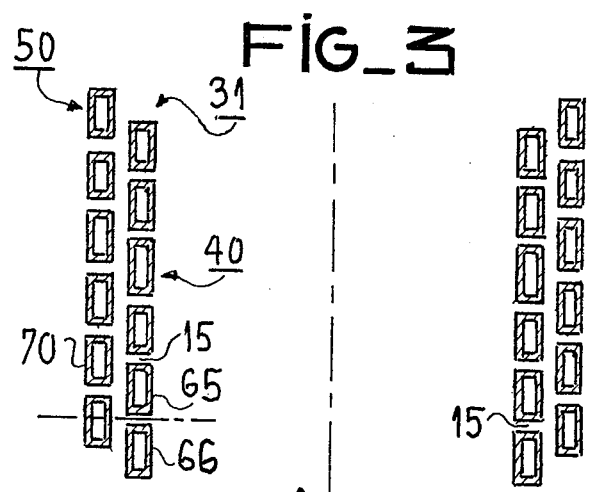
FIG_3
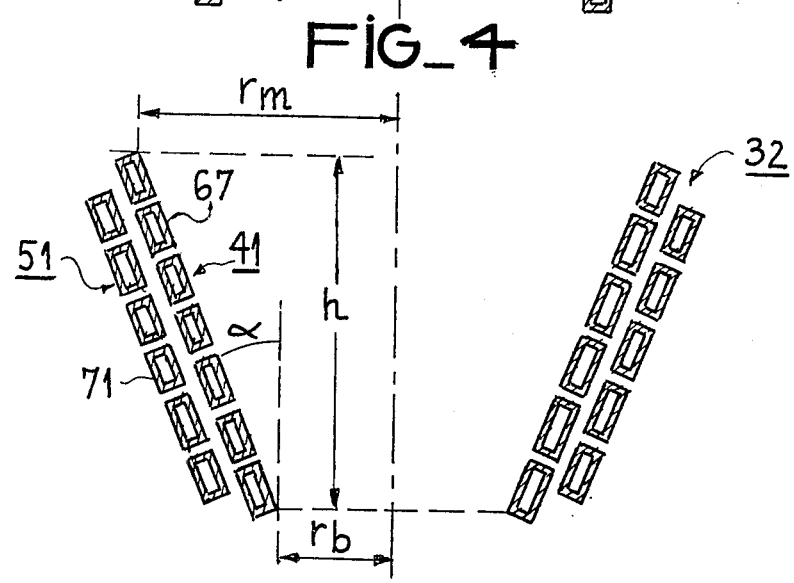
FIG_4
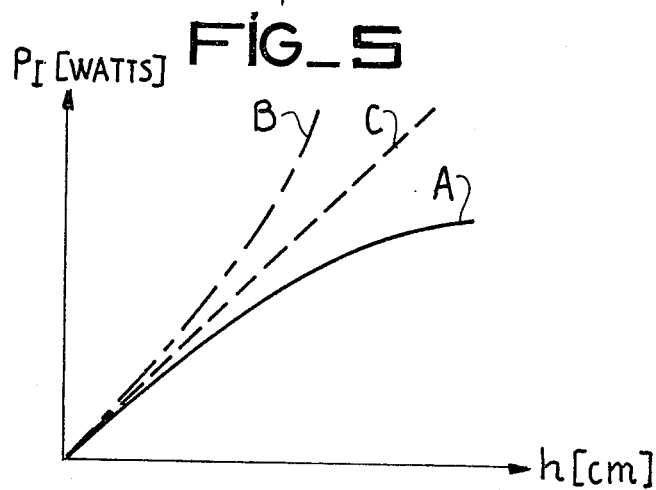
FIG_5

DIRECT INDUCTION MELTING DEVICE FOR DIELECTRIC SUBSTANCES OF THE GLASS OR ENAMEL TYPE

BACKGROUND OF THE INVENTION

The invention relates to a direct induction melting device (or furnace) for dielectric substances which are insulating when cold, but which become conducting above a temperature threshold proper to each substance, which will be called temperature of inductibility or of electrical conduction in what follows. More precisely, such substances are perfectly insulating when cold but their resistivity decreases sharply and becomes, for example, less than $10^{-2}$ ohm/m²/m, with the increase in temperature, beyond a threshold value called temperature of inductibility, between for example 600° and 1000° C., so that they become capable of conducting currents induced in the mass by an alternating magnetic field (of medium or high frequency) generated by means of an inductor surrounding a charge of such a substance.

In the following text, the expression "direct induction" will mean that the seat of the induced currents is the charge itself, which is to be heated by them up to and/or above its melting point. For a charge comprising solely substances which are insulating when cold of the above-mentioned type, a portion thereof must be preheated so as to reach the temperature of inductibility with conventional means such as a removable "susceptor" made from a refractory material, which is conducting when cold, such as metal (tungsten, molybden, for example) or graphite plunged temporarily into the divided charge (see, for example, publication FR-A-No. 1 509 985, page 2, left-hand column, lines 6 to 16), or, if it is a question of melting metal oxides one of whose metal components reacts in a highly exothermic way with oxygen, i.e. by releasing a great deal of heat, there may be deposited on or in the charge, a small quantity of grains or shavings of this metal which, when molten by induction, oxidize and allow the adjacent parts of the charge to become locally conducting so that they become the seat of induced currents (see, for example, publication FR-A-No. 1 427 905, page 2, right-hand column, lines 6 to 17). For example, when it is a question of melting glass containing silica ($SiO_2$), it is possible to use metal silicon powder or grains which, when oxidizing, is added to the silica of the charge without contaminating it when oxidized.

In a direct induction electric furnace, no intermediate heating means is used, such as a refractory metal or graphite crucible, between the inductor and the charge. This means that one may use either a crucible made from an insulating refractory material with a temperature of inductibility higher than the melting temperature of the charge (see FR-A-No. 2 054 464), or a cage or a crucible cooled to a temperature substantially lower than the temperature of inductibility of the charge, which crucible may be made from a dielectric material (quartz or silica, see FR-A-No. 1 509 985) or from a conducting material, formed by means of tubular metallic elements which are arranged side by side to form a cylinder and insulated from each other (see for example FR-A-No. 1 492 063 corresponding to U.S. Pat. No. 3,461,215 or GB-A-No. 1,221,909, where the inwardly-turned faces of the cooled walls of the cage (or crucible) are overlaid with a layer formed by the substance constituting the charge, in a powdered, granular or sintered form, or else agglomerated by the heat or a substantially continuous transition between these forms. This peripheral layer which is electrically and thermally insulating, replaces the prefabricated refractory crucible (from whence the name "self crucible" or "in situ" melting pot formation).

In publication FR-A-No. 1,186,996 there is described and in the above-mentioned publication FR-A-No. 1 492 063 (see page 1, left-hand column, lines 17 to 24 and 30 to 38), there is mentioned a direct induction melting device in which an inductor formed by a double metal wall, cooled by internal fluid flow, serves simultaneously as single-turn inductor, crucible and member for shaping an of ingot of electrically molten material. More precisely, the single-turn inductor comprises two coaxial cylindrical metal walls (of different diameters) respectively closed off at their ends by annular walls, as well as by two parallel and adjacent longitudinal walls which form therebetween a narrow longitudinal slit, so as to form a hollow and sealed conducting body which is capable of being cooled by an internal fluid flow (water). The two ends of the single open turn, situated on each side of the slit, are respectively electrically coupled, by means of an impedance matching transformer to the terminals of an AC generator of suitable power.

As in the case of the above-mentioned cold cage, the peripheral part of the charge of the substance which is dielectric when cold, which covers the cooled inner wall of the single turn inductor, forms a cylindrical envelope which insulates this wall electrically and thermally from the rest of the charge which is, molten or which has reached its temperature of inductibility.

In the vicinity of the slit of the single turn inductor there is produced a circumferential electric field of high intensity which has practically no harmful effect, if the materials forming the charge have temperatures of inductibility not very different from their respective melting point (this is the case for silica, magnesia and alumina, for example). Other refractory materials, for example metal oxides such as zirconia, titanium oxide or thoria, or mixtures containing one of these, have temperatures of inductibility substantially lower (1000° to 1500° C.) than their melting points (2000° to 3000° C.), and they may then become conducting in the solid state and contribute to the formation of electric arcs between the edges of the slit which, by heating the adjacent parts, would produce short circuits capable of stopping the melting and/or damaging the inductor and the generator.

The value of the inductance of a cylindrical single-turn inductor formed from a flat strip is an increasing function of the radius of the turn and a decreasing function of the width of the strip, which limits appreciably the height of the volume of the charge. Since this inductance is relatively small, it is necessary to use high or very high frequencies (between a few hundred kilohertz and a few megahertz), for which tube oscillators are indispensable, for thyristor inverters whose efficiencies are very high generally do not exceed 50 kHz. Power triodes and tetrodes, usable in such oscillators, have relatively high anode or internal resistances with respect to the load impedance of the parallel resonant circuit comprising the single turn inductor, which implies the use of an impedance matching transformer whose primary winding in the anode circuit comprises a large number of turns with respect to those of the secondary, as well as a leakage inductance which may absorb a large part of the reactive power developed. The depth of penetration of the currents into the charge as well as stirring of the bath are also lower at high frequencies.

The present invention allows most of the drawbacks of the state of the art known up to now to be remedied, which drawbacks result either from the use of the single turn inductor crucible associated with the use of a high frequency or from the use of a cold multi-segmented cage whose presence in the field of the inductor causes both additional losses by Joule effect in the cage and a coupling loss between the inductor and the charge. This coupling loss reduces, on the one hand, the electric efficiency of the inductor in so far as the heat contribution to the charge is concerned and, on the other hand, it attenuates the effect of the electromagnetic forces confining and stirring the bath, beneficial in the present case. The thickness of the solid film which is formed, in the neighborhood of the cold wall, is thus reduced and consequently the heat insulation which it provides with respect to the charge in contact therewith.

SUMMARY OF THE INVENTION

It is an object of the invention to provide an electric direct induction furnace for heating, (melting) charges from fifty to several hundred kilograms of glass or vitreous (inorganic) enamel, in a receptacle-inductor whose inner diameter may consequently be generally greater than 0.5 m and which, because it comprises several turns, may be supplied with alternating current of medium frequency (less than 50 kHz) having a depth of penetration very much greater than that of the high or very high frequency currents (in the range from one hundred kilohertz to a few megahertz) which must be used with the single turn inductor. Multi-turn inductors of a cylindrical or truncated cone shape are known per se and described, for example, in publication DE-C-No. 886 353.

More precisely, the present invention provides a device for melting by direct induction dielectric substances whose inductibility and melting temperatures are close to one another, which comprises a receptacle whose lateral cooled wall is formed by the heating inductor itself.

According to the invention, this receptacle-inductor is formed from a plurality of tubular conducting metal turns, electrically and hydraulically connected in series, assembled by superposition so that the center of each turn coincides with the vertical axis of symmetry of the inductor, in order to form a hollow body extending substantially over practically the entire height of the sidewall of the receptacle.

BRIEF DESCRIPTION OF THE DRAWINGS

The invention will be better understood and other objects, features and advantages will become clear from the following description and the accompanying drawings to which it refers, given by way of example, in which:

FIG. 1 shows an axial elevational cross-section of a first embodiment of the device of the invention;

FIG. 2 shows a partial axial elevational cross-section of the preferred embodiment of the multi-turn inductor-crucible sidewall of the device of FIG. 1;

FIG. 3 shows schematically an axial elevational cross-section of an advantageous embodiment of an inductor with several coaxial windings;

FIG. 4 shows schematically an axial elevational cross-section of an advantageous embodiment of an inductor for a high yield furnace; and FIG. 5 shows a diagram illustrating the power induced as a function of the height of the bath in an inductor-receptacle furnace with cylindrical sidewall (A) and a truncated cone-shaped sidewall (B).

DESCRIPTION OF THE PREFERRED EMBODIMENTS

In FIG. 1, there is shown an elevational sectional view of a vertical direct induction furnace including a receptacle 1 whose cooled sidewall 2 comprises a multi-turn inductor 3 formed from two coaxial windings or layers 4,5 in the form of solenoids.

Each of these windings 4,5 is made from a tubular conductor of rectangular cross-section, and has a plurality of superposed and evenly spaced turns, which are furthermore electrically and hydraulically connected in series. Windings 4 and 5 are respectively formed of turns 6 and 7 having different diameters so that one 5 surrounds the other 4 and extend over practically the whole height of receptacle 1.

Inductor 3 is thus formed from two coaxial solenoidal windings 4 and 5, which are connected together in series so that the magnetic fields which they generate when they have the same alternating current passing therethrough, are added together inside the space defined by the inner winding 4. Connection of the two windings 4, 5 in series increases by about four times the inductance of inductor 3 (because of the mutual inductance M) with respect to that of a multi-turn inductor with a single winding, which results in an appreciable reduction of the strength of the electric field between two adjacent turns 6 of the inner winding 4 whose inwardly-turned faces (those facing the vertical axis of symmetry) are exposed so as to enter into contact with charge C whose periphery P they are to cool. The reduction of the strength of the electric field because of the presence of the outer winding 5 allows the spacing required between adjacent turns to be reduced.

If for any reason whatsoever it is desired to reduce the inductive reactance of inductor 3, it is also possible to connect the two windings 4 and 5 in parallel.

When windings 4 and 5 are connected in series it is possible to insert the inner winding 4 between two halves of the outer winding 5 or to connect one of the terminals of the inner winding 4 to ground at the interconnection either with the outer winding 5 or with the secondary of the impedance matching transformer (not shown) which couples the inductor 3 to the power generator (not shown).

The spacing (a few millimeters for example) between the adjacent turns of the inner winding 4 or of a multi-turn inductor with a single winding (which this winding 4 may symbolize) is chosen as small as possible so that the cooling effect which they exercise at this location (at the level of the slit between adjacent turns) is sufficient to prevent the particles of the charge which are in the vicinity to reach a temperature such that they cease to be dielectric (insulating).

Windings 4 and 5 or the single winding inductor is provided with a coating 8 of an insulating material such as a refractory cement or a silicon based resin (such as the one commercialized in France under the name "SILASTENE", a registered trademark), so as to ensure the mechanical strength thereof, on the one hand, and the tightness to the particles of the charge C on the other. This coating 8 is formed so that at least the inner metal face of the turns 6 of the inner winding 4 (or of the single layer soleniodal inductor) and preferably, even a part of their faces normal thereto, are left free to come into contact with the periphery P of charge C, where will be formed the unmolten insulating layer which serves as a crucible lining.

It should be noted here that refractory ceramic insulating felt spacing strips (made from alumina, for example) or ceramic plates forming spacers may be inserted in the space between adjacent inner turns 6 before coating the inductance 3.

As was mentioned above, such a device for melting by direct induction in a receptacle 1 whose cooled sidewall 2 comprises at least one part 4 of the multi-turn inductor 3 which at the same time heats charge C by induction and cools the periphery thereof, may be used for substances which are insulating when cold, whose temperatures of inductibility and melting coincide substantially such as glasses or vitreous enamels whose resistivity curves as a function of the temperature present a very low electric conductibility short of temperature thresholds which, depending on the glass, are between 700° to 1000° C. which avoids electric arcing in the peripheral "frozen" layer P of charge C, between adjacent turns 6.

Furthermore, the natural proximimity existing between the inner wall of the single layer inductor (or inner winding 4) and the periphery P of the dielectric charge C, creates in the molten, i.e. conducting, state of the material, sufficiently strong forces of repulsion in the bath to push this latter away therefrom and thus to increase the thickness of the solid insulating film which is formed in contact with the cold wall of the inductor-receptacle. Consequently, the heat losses from the bath to the inductor which constitutes at the same time the cold sidewall of the receptacle, are considerably reduced and the performances of the system appreciably increased (by 40 percent for example, as will be mentioned further on, in the particular case of melting glass compared with conventional devices with independent inductor and cooled cage).

The bottom of receptacle 1 is closed off by means of a baseplate 9 made from refractory bricks (for example from a material called "ZAC") or cooled (made from a hollow conducting material, for example). To allow casting of the molten glass, this baseplate 9 may be provided with a central hole 10 through which may be passed a nozzle 11 made from a refractory electrically conducting material such as tungsten, graphite ("carborundum") or silicon carbide. The part of nozzle 11 which projects from bottom 9 is surrounded by a conventional inductor 12 for heating it during casting by means of an independent generator capable of supplying between 10 and 15 kilowatts, for example, to bring it to a temperature greater than the melting temperature of the substance contained in the furnace (cf. FR-A-No. 2 054 464).

The initiation of melting is effected here, preferably, by using a removable "susceptor" made from a refractory conducting material (graphite or tungsten). This susceptor may be plunged into the charge C, before inductor 3 is being fed by alternating current; it is in this case preferably cylindrical or annular in shape and suspended by means of cables 13 made from a refractory metal such as molybdenum, for withdrawing it from the bath.

It may also, as shown in FIG. 1, be in the form of a radiating vault or bell 14 made from graphite, which may be disposed in the field of inductor 3 above charge C made from frit which must not then entirely fill receptacle 1. With inductor 3, vault 14 can be brought up to a sufficient temperature to melt, by radiation (infrared), a surface layer of charge 3, the melting then being propagated into the rest in a way known per se. Vault 4 will have to be retracted by means of the suspension cables 13 to allow filling of receptacle 1 by means of a hopper (not shown) containing frit, powder beads or pieces (balls or other particles) of the substance to be melted.

FIG. 2 shows a partial elevational cross-section of the preferred embodiment of a multi-turn inductor forming at the same time the cooled sidewall of a receptacle for direct induction melting, which allows a peripheral insulating layer of the substance constituting the charge to be formed, so as to obtain in situ a non polluting temporary crucible lining.

In this preferred embodiment, the multi-turn inductor 30 (or each of its coaxial windings or layers) is formed from annular (circular) open and superimposed turns, made from a tubular conductor (copper) of rectangular section, whose opposite ends are respectively connected to those of adjacent turns 61 and 62 by tubular lengths 63 and 64, each being orientated preferably in the direction of a generatrix (parallel to the vertical axis).

This kind of connection between the turns of a one-layer coil, generally called "staircase", improves the symmetry of the molten bath with respect to that obtained by means of a conventional helical coil (solenoid).

The hollow turns 6 or 60 are orientated so that the large sides of their rectangular section are vertical and their small sides horizontal so that, because of the small distances between adjacent turns, their cold surface forms the major portion of the inner face of the receptacle, i.e. that it is as large as possible and that, despite this small spacing, the undesired capacitances between adjacent turns are as small as possible.

It should be noted here that when inductor 3 comprises several concentric layers or windings, those (outer) which do not serve for cooling the lateral periphery P of charge C, may be made from tubes of different cross-sections, such as circular and may comprise pitches and numbers of turns which are also different in order to reduce the capacitances between the layers and/or to obtain desired inductance values.

The arrangement of the inductor-receptacle having two coaxial multi-turn windings of the same pitch, with the turns of the windings of the same section disposed radially in the same respective planes, in the way shown in FIG. 1, may result in a certain weakening of the alternating magnetic field in the vicinity of slits between the adjacent turns of the inner winding, particularly because the respective magnetic fields due to the a.c. electric currents flowing through the two concentric inductors may be oppositely directed there and undergo a kind of vectorial substraction. This localized attenuation may be reduced by a special arrangement of one of the windings with respect to the other, which consists in a relative offset in the axial direction so that the cross-section of the windings in a diametrical plane passing through this axis, form a pattern similar to two rows of a quincunx.

Such an arrangement of the multi-layer inductor (with two windings) has been shown schematically in section in FIG. 3.

In FIG. 3, there is shown a diametrical and axial section, in elevation, of a multi-turn inductor 31 having two coaxial cylindrical windings 40,50, the inner one of which 40 forms the major part of the cooled sidewall of the receptacle.

Each turn 65, 66, 70 is formed from a rectangular section tube. This improvement consists in offsetting axially the outer winding 50 with respect to the inner one 40 so that the median plane of each turn 70 of this latter is substantially situated at the level of that of the slit 15 separating two adjacent turns 65,66 of the inner winding. This measure compensates, in part, for the relative weakening of the magnetic field and consequently of the intensity of the current induced at the level of this slit 15. The section thus forms a pattern similar to two rows of a quincunx.

Another embodiment of the invention is more particularly adapted for improving the energy efficiency of a vertical direct induction furnace where the inductor itself or one of the two coaxial inductors (the inner one) itself forms the cold sidewall of the receptacle (crucible) containing the substance to be melted. This embodiment is applicable more especially to high power furnaces intended, particularly, for high resistivity materials (in the hot or molten state) in which the depth of penetration of the magnetic field exceeds considerably the radius of the molten charge, contained in a cylindrical receptacle.

Cold receptacles of other shapes other than cylindrical are known, for example, from the publication FR-A-No. 2 036 418 which describes a direct induction furnace forming an advantageous improvement of the one described in the above-mentioned publications FR-A-No. 1 492 063, where the cold divided (segmented) duct forming the lateral wall of the receptacle comprises a cylindrical outer wall, surrounded by a solenoidal inductor and an inner wall constricted towards the bottom (widening towards the top). On the other hand, in publication FR-A-No. 2 303 774, the cold duct has a truncated cone shape widening towards the bottom (narrowing towards the top) with an angular opening in its diametrical section of about 4° to 20°, for example. Such a direct induction furnace is more particularly adapted to the formation of mono- or polycrystalline objects (ingots) of refractory metal oxides, by continuous melting and drawing, obtained by the downward movement of a cooled plate which closes off, at the beginning of melting, the bottom of the duct.

In the embodiment of the invention, shown in FIG. 4, the multi-turn inductor-receptacle or the inner winding of an assembly of several coaxial windings, is formed by an assembly of circular turns superimposed and connected in series, whose respective diameters increase with the height with respect to the base, so that the sidewall of the receptacle has a truncated cone shape, constricted towards the bottom. The external windings have a similar form and are preferably disposed with their turns aligned with the slits of the winding which they surround.

In FIG. 4, another embodiment of the invention is shown, for a high yield furnace which is made possible by the truncated cone shape of the multi-turn inductor-receptacle 32 which may comprise one 41 or several 41,51 coaxial windings. These windings 41,51 may be offset with respect to each other, along their parallel generatrices, in a way similar to that shown in FIG. 3. The truncated cone forming the sidewall of the receptacle (melting pot) has been shown as widening out towards the top, which forms the preferred embodiment for a vertical induction furnace, intended for continuous casting through a heated nozzle (see FIG. 1 or the above-mentioned publication FR-A-No. 2 054 464). The opening angle of the cone $2\alpha$ is chosen as a function of the height h of the receptacle, so that at the top the maximum radius $r_m = d/2$ thereof is substantially equal to the depth of penetration p of the alternating magnetic field of high or medium frequency. The respective turns 67,71 of the two windings 41,51 are preferably arranged so that the large sides of their rectangular section are aligned parallel to the generatrix of the truncated cone.

Experience has shown that at the start of melting in the lower part of the inductor-receptacle (situated adjacent the bottom at the minimum radius $r_b$), the penetration of the induced currents is very often much greater than the radius of the initial charge which forms in fact the foot of the bath. Therefore, the electric as well as the thermal efficiency (yield) of the furnace is initially limited. However, the power consumed, because of the small volume of the initial bath, is relatively small and the depth of penetration which is too great is not too harmful. The power supplied must nevertheless be sufficient to keep the bath going and cause it to progress in height (or in volume).

In the case of a cylindrical inductor-receptacle, the power required by the bath which is rising, increases at the beginning substantially linearly with the height thereof. Afterwards the power consumed increases less rapidly because of the unfavorable evolution of the ratio of the diameter d of the bath (which remains constant) to its height h (which increases), that is to say that the ratio d/h decreases with the increase in height. In other words, in the case of a cylindrical receptacle-inductor, the average energy flux or the average power per unit volume, expressed in watts per cubic centimeter (W/cm³) induced in the bath, which depends on the ratio d/h, tends to decrease with the progress in height.

This has been shown by the diagram A in FIG. 5 which shows the evolution of the induced power with the height of the bath. This diagram A (shown by a continuous line) shows that for a cylindrical bath, it would be necessary either to reduce the progress of the power supplied to the inductor with the height of the bath with respect to a linear evolution (curve C of FIG. 5, shown by a broken line), or to limit the rate of supplying the furnace with solid glass (or enamel) frit and, consequently, that of the continuous casting. In other words, the power per unit volume (in W/cm³) decreases with the height of the bath.

In the case of an inductor-receptacle with a truncated cone shaped sidewall, a substantially constant ratio d/h may be obtained so as to maintain a linear evolution (curve C) or even more rapidly increasing evolution of the induced power P, as a function of the opening angle $2\alpha$ of the truncated cone. Progress greater than the linear evolution of the power, i.e. an overall increase in the power per unit volume, has been shown by diagram B in FIG. 5 (shown with a mixed dash line).

By way of example, in a furnace with a cylindrical sidewall and a nominal capacity of 40 liters (100 kg of liquid glass at 1400° C.), there is obtained an average energy flux of 3W/cm³ at the beginning (foot of the bath) which decreases to 2.5W/cm³ at full capacity and its speed of "digesting" (melting) the solid glass drops from 50 Kg/hour at the beginning to 40 Kg/hour, with unchanged electrical parameters.

In a furnace with a truncated cone shaped wall of the same capacity, having an angular opening $2\alpha$ of 30° (the slope of the generatrix with respect to the axis of symmetry being 15°), the initial power per unit volume 3W/cm$^3$ rises gradually to 3.5W/cm$^3$ and even beyond, as the height of the bath progresses. For such a furnace in fact the ratio of the depth of penetration of the induced currents to the radius of the bath ($\rho = p/r$), which is at the beginning less than unity, tends to draw closer thereto with the growth of the height of the bath. Now, the thermal (and electrical) efficiency of the system comprising the furnace and the liquid charge becomes maximum when the depth of penetration p becomes equal to the radius r. In a furnace with a truncated cone shaped wall, the feeding rate of solid frit remains substantially constant and may even increase during the filling cycle of the furnace. Of course, the variation of the diameter of the turns with the distance with respect to the bottom may be other than linear and the constriction may be reversed if it is desired to draw ingots.

It should be noted, more especially, that the higher inductance of the multi-turn inductors forming at the same time the cooled sidewall of the receptacle, allows medium industrial frequencies to be used, preferably between 10 and 50 kHz, which may be produced by inverters (static DC/AC converters) or cyclo-converters (static AC/AC converters), or else by motor-alternator units whose efficiency is better than that of the vacuum tube oscillators (triodes).

Industrial furnaces for melting by direct induction glasses or similar substances of this kind (silica based), allow production capacities of 50 to 500 kg of molten vitreous material to be obtained per hour, heated to temperatures between 1200° and 1600° C., for example with active consumed powers going respectively from 100 to 1000 kilowatts.

If we compare the efficiency of a segmented cold cage furnace surrounded by an inductor with that of a combined cage and multi-turn inductor furnace in accordance with the invention, we obtain for similar capacities (volumes) and a power of 100 kilowatts supplied by the generator, 27 kg/hour for the first and 40 kg/hour for the second.

What is claimed is:

1. A device for direct induction melting of charges made from substances which are dielectric when cold and which present temperatures of inductibility close to their melting points, including a heating inductor having at least one winding made up from a plurality of superposed closely-spaced turns of conducting metal tubing, electrically and hydraulically connected in series and having a vertical axis of symmetry, said winding carrying a flow of both an alternating electric current and of a cooling fluid, and a receptacle of electrically insulating material for containing said charges, having a sidewall in which said inductor extending over substantially the entire height thereof, is contained, wherein at least the inwardly-turned faces of innermost one of said at least one winding are uncovered, so as to make the major portion of the inner face of said receptacle sidewall entering into direct contact with the periphery of the charge, a metallic and cooled surface.

2. A device as claimed in claim 1, wherein the metal tubing having a rectangular cross-section, the large sides thereof are orientated in parallel to the generatrix of the inner face of said receptacle sidewall, and wherein the spacing between adjacent turns of the innermost winding is chosen so as to maintain the charge substance located within said spacing and adjacent thereto, in its dielectric state.

3. A device as claimed in claim 1 or 2, wherein each of the turns making up said at least one winding is of circular shape kept open by a slit, and whose opposite ends are respectively electrically and hydraulically connected to those of the adjacent ones by means metallic tubular sections orientated in parallel to the generatrices of said receptacle inner face.

4. A device as claimed in claim 1, wherein said inductor comprises at least one further outer winding having a plurality of turns, which is parallel to said innermost winding and surrounds it coaxially, said at least one outer winding being connected to said innermost one in such a way that the respective magnetic fields they generate are added inside the receptacle.

5. A device as claimed in claim 4, wherein said receptacle comprises an outer, electrically insulating coating which leaves the inwardly-turned faces of the innermost winding inncovered, while said at least one further winding is completely embedded therein.

6. A device as claimed in claim 4, wherein the adjacent ones of said windings surrounding each other coaxially, are offset along their parallel generatrices in such a way that the median plane of each turn of one of them substantially coincides with the median plane of the spacing between two adjacent turns of the other one.

7. A device as claimed in claim 1 or 4, wherein the generatrices of all of the windings are parallel to said axis of symmetry, the inner face of said receptacle sidewall thus being cylindrical.

8. A device as claimed in claim 1 or 4, wherein the respective diameters of the plurality of superposed turns making up each winding of the inductor vary as a function of their respective axial distances relatively to the bottom turn thereof.

9. A device as claimed in claim 8, wherein the respective diameters of said plurality of turns vary as a linear function of their axial distances to the bottom turn, so as to provide the receptacle with a sidewall whose inner face is in the shape of truncated cone.

10. A device as claimed in claim 9, wherein said truncated cone-shaped inner face of said receptacle sidewall widens towards the top.

11. A device as claimed in claim 1 or 4, further comprising a removable, susceptor wherein said susceptor is in the shape of a vault made from a radiation emitting, electrically conducting material, which is to be initially disposed above and adjacent the top of said charge within the alternating magnetic field of said heating inductor, whereby to bring a surface layer of the dielectric substance making up the charge to its temperature of inductibility.

12. A device as claimed in claim 11, wherein said suceptor is made of graphite.

* * * * *